United States Patent [19]
Fabrizi et al.

[11] Patent Number: 5,094,626
[45] Date of Patent: Mar. 10, 1992

[54] SET OF ASSEMBLY ELEMENTS INTENDED TO FACILITATE CONCURRENT ELECTRICAL CONNECTION OF A PLURALITY OF MODULAR AUTOMATIC CIRCUIT BREAKERS

[75] Inventors: Fabrizio Fabrizi, Bergamo; Sergio Pianezzola, Varese, both of Italy

[73] Assignee: Bticino S.p.A., Italy

[21] Appl. No.: 617,580

[22] Filed: Nov. 26, 1990

[30] Foreign Application Priority Data

Nov. 27, 1989 [IT] Italy ............................ 22156/89[U]
Nov. 27, 1989 [IT] Italy ............................ 22516 A/89

[51] Int. Cl.⁵ ........................ H02B 1/00; H01R 13/08
[52] U.S. Cl. .................................... 439/511; 361/355
[58] Field of Search .................... 439/507–514, 439/715, 716, 717; 361/376, 378, 341, 353, 355, 361, 363; 174/71 B, 72 B

[56] References Cited

U.S. PATENT DOCUMENTS

| | | | |
|---|---|---|---|
| 1,817,737 | 8/1931 | Demonet et al. | 439/511 |
| 2,786,162 | 3/1957 | Ballou | 361/353 |
| 3,155,882 | 11/1964 | Casey | 361/353 |
| 3,289,049 | 11/1966 | Middendorf | 361/376 |
| 3,909,097 | 9/1975 | Roth et al. | 439/511 |
| 4,171,861 | 10/1979 | Hohorst | 439/716 |
| 4,582,377 | 4/1986 | Wilmes | 439/514 |
| 4,689,718 | 8/1987 | Maue et al. | 439/511 |
| 4,989,118 | 1/1991 | Sorenson | 439/715 |

*Primary Examiner*—Neil Abrams
*Attorney, Agent, or Firm*—Leydig, Voit & Mayer

[57] ABSTRACT

A set of assembly elements for facilitating concurrent electrical connection of a plurality of modular automatic circuit breakers. The circuit breakers are installed as a package on a rail in a supply and protection station for an electric system. The set of elements includes a bar of an electrically conductive material, and mating means of the quick-coupling plug-and-socket type, the socket means being associated with each breaker, and the plug means being associated with the bar.

6 Claims, 2 Drawing Sheets

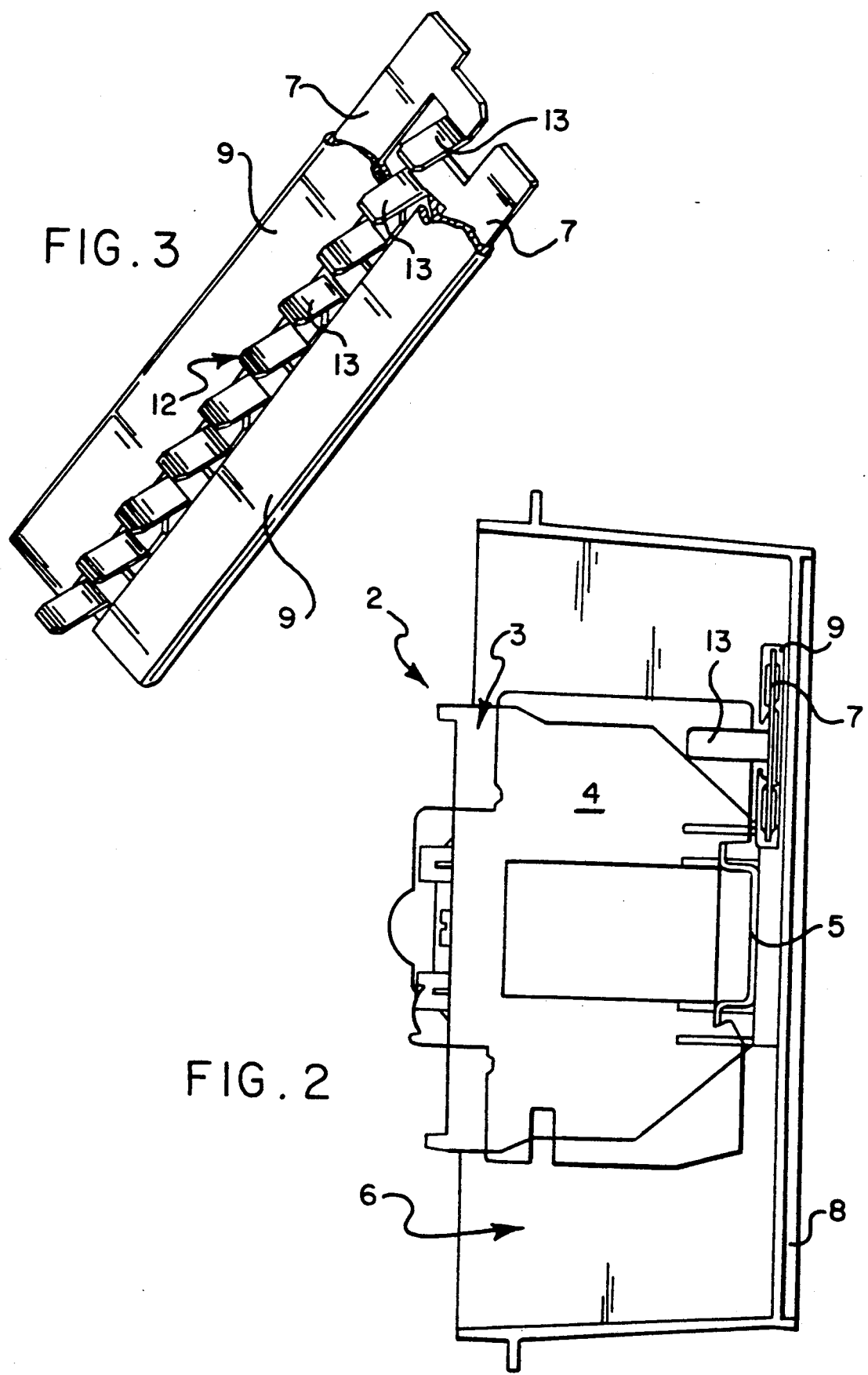

SET OF ASSEMBLY ELEMENTS INTENDED TO FACILITATE CONCURRENT ELECTRICAL CONNECTION OF A PLURALITY OF MODULAR AUTOMATIC CIRCUIT BREAKERS

DESCRIPTION

This invention relates to a set of assembly elements intended to facilitate concurrent electrical connection of a plurality of modular automatic circuit breakers installed into a package on a rail in a supply and protection station for an electric system and being each provided with at least one input and output terminal for connection to electric cables of said electric system.

As is known, electric supply systems are led to circuit breakers and stations of the above-mentioned kind both in civil and industrial environments.

Such stations, which are usually flush-mounted, comprise a box-type case with a lid or cover, wherein the circuit breakers fit by snap action on a rail, e.g. a DIN sectional member.

Each breaker is provided, of course, with at least one input terminal, and corresponding output terminal, for connection to respective ends of electric system cables.

Modular breakers of this kind enable supply stations to be assembled in an orderly and compact fashion. However, where space is at a premium inside the station, the installer invariably encounters considerable difficulties in connecting the breakers together as well as in connecting the various electric cable ends to their respective breakers.

In fact, many electric cables are usually led to such a station which crowd in the limited space available, thus making for difficult identification, as well as completion, of the connections involved.

To obviate this problem, the use of a bus bar has been proposed, basically configured comb-like with teeth inserted and clamped in corresponding terminals of the various breakers.

This approach, while making the concurrent connection of plural breakers easier, has a serious drawback. Any connection servicing operation becomes especially laborious, to the point that a breaker cannot be replaced without releasing each of the "teeth" from their corresponding terminals.

The technical problem that underlies this invention is to provide a set of assembly elements having such structural and functional characteristics as to facilitate concurrent electrical connection of a plurality of modular circuit breakers, as pre-installed into a package on a rail of an electric power supply station, as well as to enable each breaker to be readily removed individually.

This problem is solved by a set of elements as specified above being characterized in that they comprise a bar made of an electrically conductive material, and quick-coupling means and mating means of the plug-and-socket type, said means being carried on each breaker and said mating means being integral with said bar.

The features and advantages of the set of assembly elements according to the invention will be appreciated from the following detailed description of an embodiment thereof, given by way of illustration and not of limitation with reference to the accompanying drawings.

In the drawings:

FIG. 2 is a vertical elevation view in cross-section of a supply station incorporating the set of elements shown in FIG. 1; and FIG. 3 is a perspective detail view of the set of elements shown in FIG. 1.

Figure 1:
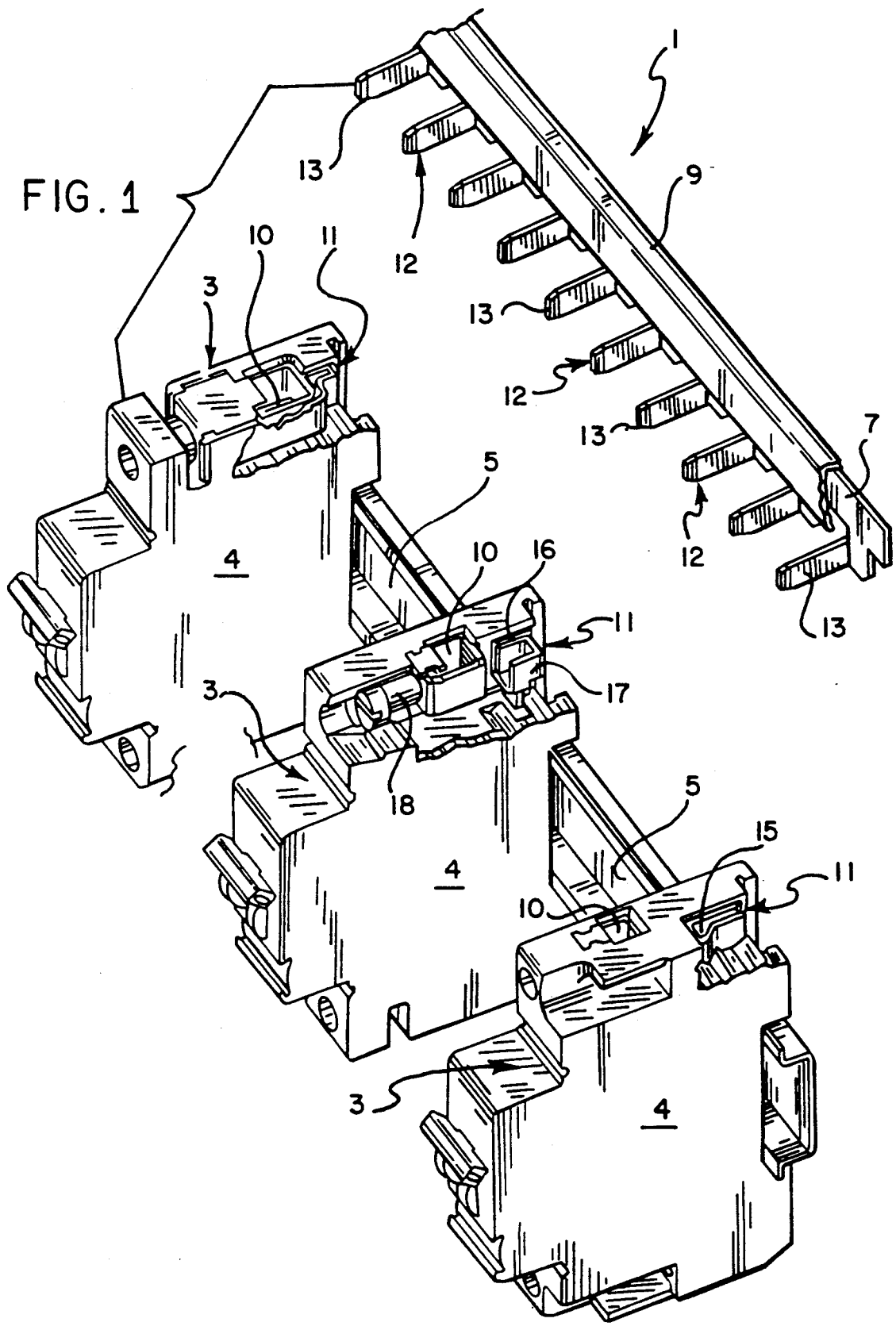
FIG. 1 is an exploded perspective view of the set of assembly elements according to the invention.

With reference to the drawing views, generally and schematically shown at 1 are a set of interfit assembled elements for facilitating concurrent electrical connection of a number of automatic circuit breakers 3.

The breakers 3 are each enclosed within a respective box-type case 4 of modular design having standard shape and size universally referred to as DIN module.

The breakers 3 are modularly installed package-fashion in an electric system supply and protection station 2.

The station 2 is of a flush-mounted type and comprises a box-type case 6, shown in section in FIG. 2. This case 6 has a back wall 8 whereto a rail 5, such as of the kind referred to as DIN sectional member, is attached to lie longitudinally at a near-central location.

The breakers 3 are a snap fit on the rail 5, one beside another under the case 6.

Each breaker has at least one input terminal 10 with a respective clamp screw 18, and a corresponding output terminal electric connection to the free ends of electric system cables.

Advantageously, according to the invention, the set 1 includes a plate-like bar 7 made of an electrically conductive material and having a plurality of reed contacts 13 formed integrally therewith and jutting out perpendicularly from the bar into a substantially rake-like configuration.

Provided on each breaker 3, that is on each module 4, is instead at least one fork contact 15 being received at a location close to the input terminal 10 and connected electrically thereto.

Each of the fork contacts 15 and each of the reed contact 13 form respective means 11 and mating means 12 of the quick-coupling plug-and-socket type, thereby enabling plural breakers 3 to be concurrently connected electrically via the bar 7, which is covered and protected by a sleeve 9 of an electrically insulative material.

Shown in FIG. 1 are some modified embodiments of the fork contact 15 mounted on each breaker 3.

In one of these variants, the contact 15 may consist of a slot 16 defined by a gap between a pair of flat portions 17 bent toward each other.

Understandably, where the breakers 3 to be installed in the station 2 are of the two-pole type, they would be each provided with a pair of fork contacts 15.

In that case, each contact 15 would be coupleable with a corresponding reed contact 13 from a respective bar 7. To this aim, shown in FIG. 3 is an example of a pair of bars 7 laid parallel to each other with their respective contacts 13 aligned and alternating with one another such that each bar allows the corresponding poles of all the breakers to be connected at the same time.

A major advantage of the set of elements according to the invention resides in the greatly simplified wiring layout they afford to the design of control stations and panels.

It may be appreciated that by connecting the electric power supply cables to a single breaker, through the input terminals 10, the power can be supplied to the other breakers in the station through the plug-andsocket quick-coupling provided for the contacts 15 and 13.

Thus, it is unnecessary for the bus bar 7 to be equipped, in turn, with terminals, since by concurrent input of the fork contact 15 and the terminal 10 to each breaker, the ability to connect one or more ends of electric cables from the electric system to each breaker is retained.

In addition, each breaker will be removable independently of the others by just uncoupling the fork contacts from their mating means of connection to the bar 7, on removing the breaker from the rail 5, of course.

We claim:

1. A set of assembly elements for facilitating concurrent electrical connection of a plurality of modular automatic circuit breakers installed into a package on a rail in a supply-and-protection station for an electric system and each breaker being provided with at least one terminal for connection to electric cables of the electric system, the set comprising a bar made of an electrically conductive material, and quick-coupling and mating means, the means comprising a socket carried on each breaker and a plug integral with the bar such that the at least one terminal of the breakers are all electrically connected to an electric cable received by the at least one terminal of one of the breakers when the plugs are inserted into the sockets.

2. A set according to claim 1, characterized in that the socket means are at least one fork contact mounted on each breaker.

3. A set according to claim 1, characterized in that the mating means are reed contacts formed integrally with and jutting out from the bar.

4. A set according to claim 2, characterized in that said at least one fork contact is connected electrically to said at least one input terminal.

5. A modular automatic circuit breaker of a type fitting removably on a rail by snap action in a supply-and-protection station for an electric system, the breaker comprising at least one input terminal, for connection to electric cables of the electric system, the terminal being in direct electric contact with a fork contact to provide a quick coupling electric connection of the plug-and-socket type to a corresponding reed contact from a rake-like configuration of a conductive bar, which can be used to electrically connect a plurality of such circuit breakers located on said rail.

6. A circuit breaker according to claim 5, characterized in that said fork contact is connected electrically to said at least one input terminal.

* * * * *